Jan. 19, 1965    J. CASTILLO    3,166,043
METHOD AND APPARATUS FOR THE HANDLING OF FISH
Filed Oct. 14, 1963    4 Sheets-Sheet 1
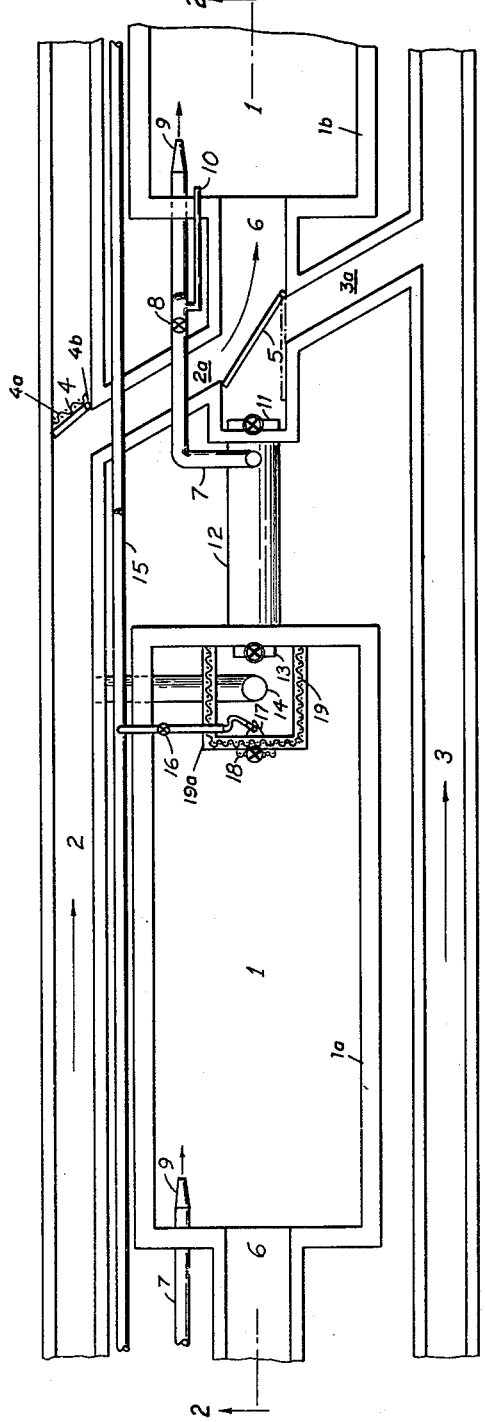
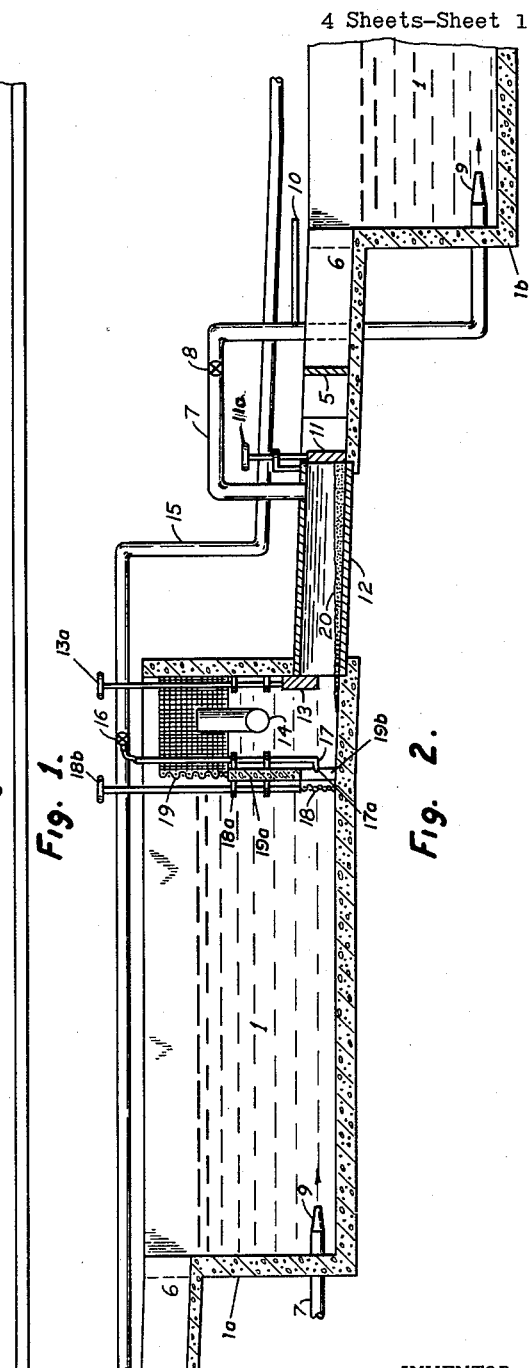
INVENTOR.
JOE CASTILLO
BY

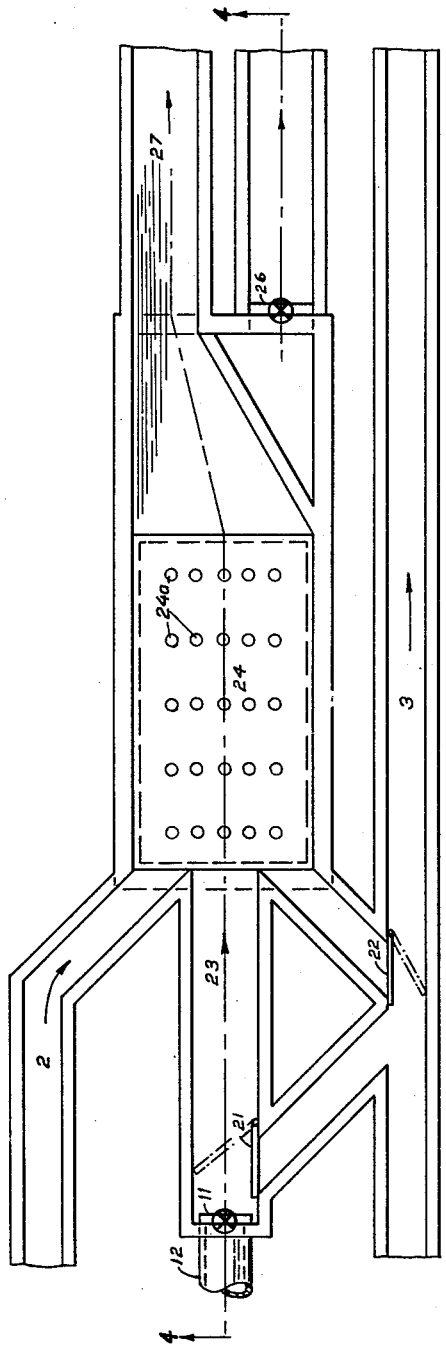
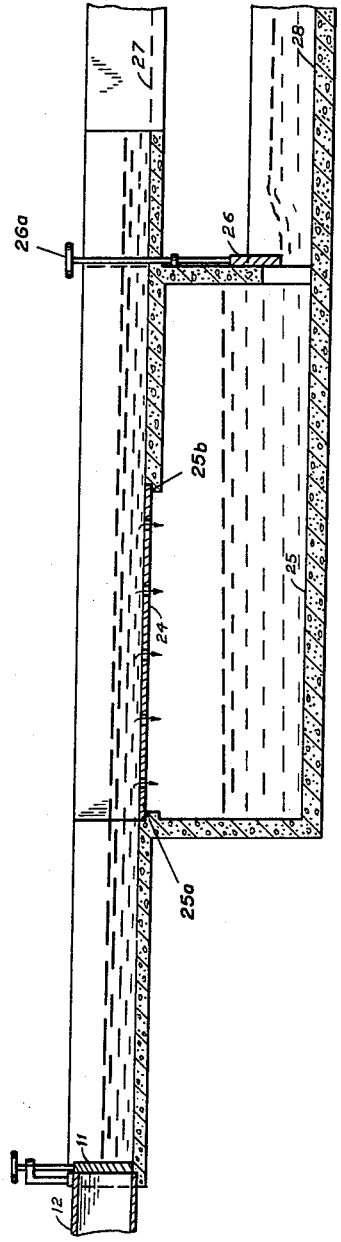
INVENTOR.
JOE CASTILLO

INVENTOR.
JOE CASTILLO

Jan. 19, 1965   J. CASTILLO   3,166,043
METHOD AND APPARATUS FOR THE HANDLING OF FISH
Filed Oct. 14, 1963   4 Sheets-Sheet 4

INVENTOR.
JOE CASTILLO
BY
Jacobi & Davidson

United States Patent Office 3,166,043
Patented Jan. 19, 1965

3,166,043
METHOD AND APPARATUS FOR THE
HANDLING OF FISH
Joe Castillo, 540 J St., Sparks, Nev.
Filed Oct. 14, 1963, Ser. No. 316,085
9 Claims. (Cl. 119—3)

The present invention relates to methods of handling fish, and to apparatus adapted to carrying out such methods.

More specifically, the present invention is concerned with methods and apparatus for rearing, separating and handling both small and large volumes of fish with equal efficiency. Prior methods and apparatus of rearing, separating and handling fish have required operations within a building in which the air and water temperature is controlled by means of refrigeration and compressors. Moreover, prior systems have required pumping and controlling of water flow between various tanks in a fishery along with the filtration of the water, thereby necessitating the use of large pumps, filtration systems, and the like requiring costly machinery and the employment of large numbers of personnel for the operation of such machinery.

The present invention eliminates these drawbacks by providing a method, and apparatus for carrying out the prescribed method, wherein an outdoor fishery comprising any number of rearing ponds from one to twenty, as required by the volume of fish to be handled, are situated at various levels in the ground so that water flow is accomplished through the force of gravity. The fish are conveyed by means of flowing water in a plurality of launders through rearing ponds, separating tanks and handling tanks. In accordance with the present invention, there is provided a method of filtration which requires little if no attention except for the removal of waste material from the waste collecting means. One of the advantages offered by the present invention over prior constructions, resides in the capability of removal of fish and water from individual ponds and tanks without disturbing other ponds and tanks in the system. In this manner, diseased fish may be removed from one tank without infecting the fish in the other tanks in the fishery. This by-passing feature is accomplished through the selective use of gates and valves and the cooperating disposition of a plurality of launders at different levels of the terrain and at different selected positions within the system whereby the natural flow of water is directed in predetermined paths through said system.

Consistent with the foregoing, the present invention has one of its primary objects the provision of a method of, and apparatus for, isolating any number of ponds and tanks in a fishery system from other ponds and tanks therein, whereby fish can be moved selectively from tank to tank, or in by-passing relation to any given tank of the system, such that a diseased tank or batch of fish can be diverted and/or isolated from the system without decreasing the efficiency of system operation, and without requiring a system "shut-down" or any excessive waste of fish being processed.

Another important object of the present invention is the provision of a method and apparatus conforming with the preceding objects and wherein a free flow of water is utilized for purposes of conveying fish in pre-determined paths through a fishery system such that there is no requirement for pumps and/or other large equipment.

It is an additional important object of the present invention to provide a method of, and apparatus for, filtration which operates with simple collection screens, adjustable gates, and prescribed water currents created in accordance herewith to effectively continuously deliver floating waste and sediment to prescribed locations whereby the main body of water within a rearing pond of the fishery system is essentially free of contaminating elements.

Yet another object of the present invention is to provide a method of, and apparatus for, automatically separating fish into predetermined size ranges during the continuous delivery of various size fish to a single separating pond. It is a further object of the instant invention, consistent with this particular object, to provide an apparatus for handling fish, which apparatus includes means for urging fish toward the discharge end of a plurality of handling tanks for gravity discharge to a batch weighing station whereby net or basket transfer is unnecessary, and gravity water flows provides the conveying medium.

The preceding rather basic objects are, as indicated, applicable to both the methods provided by the instant invention, and the apparatus provided hereby for carrying out such methods. However, with particular regard to the apparatus, there are certain further objects of particular significance including the following: (a) the provision of a rearing pond assembly which incorporates a simple filtration arrangement in association therewith for collecting floating waste material at one location at an upper level of the pond and for collecting sediment adjacent a lower level and outside of the pond whereby the main body of water within the pond is free of undesired foreign material; (b) the provision of such a rearing pond assembly which maintains a batch of fish therein during the waste collection operation, but operates in the collection operation through the use of a water current fed thereto, which water is effectively given alternate paths by the filtration arrangement associated with the pond; (c) the provision of a system incorporating an integrated arrangement of rearing ponds conforming with the preceding objects, and wherein the current flow into an initial and upper level pond is utilized, through gravitational forces, for purposes of providing a fluid flow into successive ponds, and wherein the filtration arrangement associated with each pond serves effectively to remove contaminates from the water flowing from one pond to a successive pond whereby each pond receives an input of substantially clean water; (d) the provision of such a fishery system which includes not only an integrated arrangement of rearing ponds or tanks, but which in addition includes delivery chutes and/or launders and discharge chutes and/or launders communicating selectively, through the use of gates and valves, with each of the ponds so as to permit a fish and/or water transfer between successive ponds, or alternatively, so as to permit discharge of the contents of a contaminated pond without moving contaminates through an otherwise uncontaminated tank; (e) the provision in a system conforming with the preceding objects of a handling tank assembly which receives fish that have been suitably processed by the fishery system, and includes means for forcing the fish to a given outlet point, while still permitting the fish to swim within an enclosed body of water; (f) the provision of such a handling tank wherein the means for moving the fish toward the outlet point is operable at selectively controllable rates, and is positionable, during operation, in a given location where it does not interfere with the delivery of fish to the handling tank; (g) the provision in a fishery system conforming with the preceding objects of a batch weighing station including a selective arrangement of chutes and troughs that serve to deliver the fish under gravitional forces and current flow to weighing pans, which weighing pans are operable to effect a batch release of fish when a given quantity of fish has accumulated therein; (h) the provision in such a fishery system of a separating pond means which is effective to separate different sizes of fish from one another so that certain size fish can be selectively delivered to one handling tank, and other size fish can be selectively delivered to another handling tank, and wherein the separation is effective by using a foraminous grading member over which, and under which, there is a water flow; and, (*i*) the provision of such a fishery system, incorporating the features outlined in the preceding objects, which fishery system can be operated for extended periods of time free of maintenance and repair, and which fishery system can be constructed from available materials and components at a comparatively inexpensive cost.

These and still other objects and the entire scope of applicability of the present invention will become apparent when consideration is given to the following detailed description of the method and apparatus for carrying out such method. Such description makes reference to the annexed drawings presenting preferred embodiments of the invention therein.

In the drawings:

FIGURE 1 is a plan view of one of the rearing ponds and part of another, showing the preferred arrangement of launders and filtration components located in the rearing pond shown in FIGURE 1;

FIGURE 2 is a sectional side elevation on the line 2—2 of FIGURE 1 and showing the launders and filtration components for the removal of waste material from the rearing pond shown therein;

FIGURE 3 is a plan view showing the preferred arrangement for one of the separating ponds and a portion of the launder system connected with the other ponds and the separating pond;

FIGURE 4 is a sectional side elevation of the separating pond and cooperating launders taken along the line 4—4 of FIGURE 3 and showing the various gate control means associated therewith;

*Method*

Figure 5:
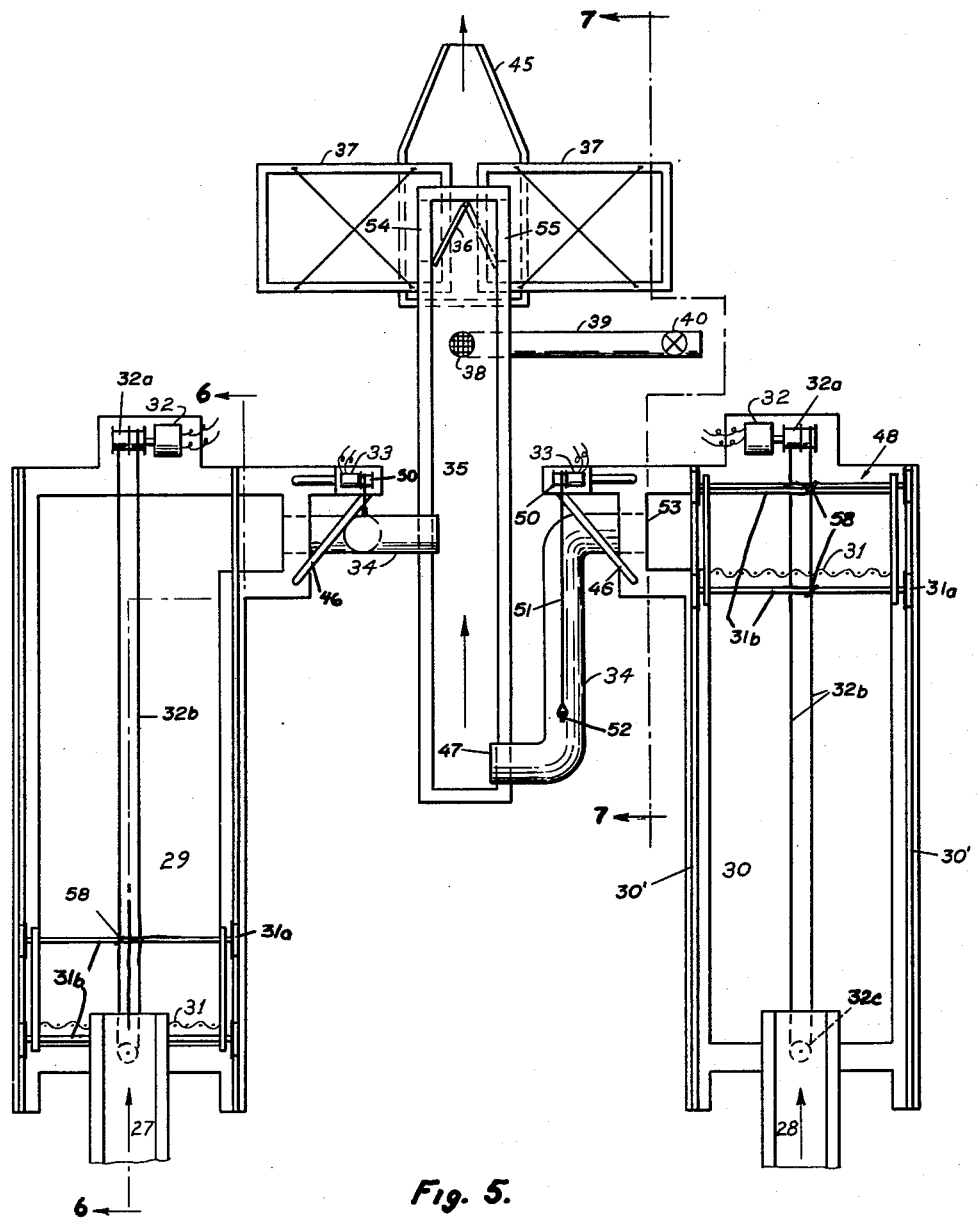
FIGURE 5 is a plan view of a plurality of handling tanks, discharge means for emptying the fish therein and a means for transferring fish to the weighing station.
Figure 6:
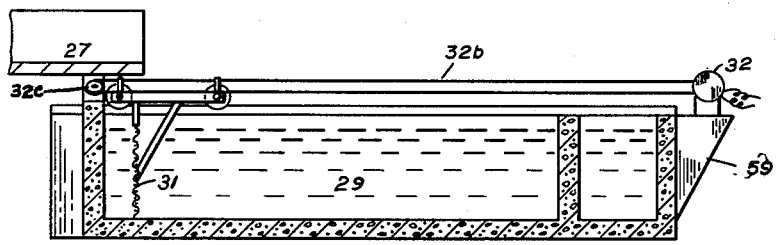
FIGURE 6 is a sectional elevation of one of the handling tanks and its associated handling apparatus taken along the line 6—6 of FIGURE 5.

The preferred method of rearing, separating and handling fish can be initially understood from the following description of the included steps.

Initially, the fish and fresh water are delivered to the rearing ponds by means of a delivery launder which runs the entire length of the fishery. Such delivery is selectively directed to a desired area by means of movable obstructions in the delivery launder which direct the fish and fresh water to the inlet ports of the rearing ponds. By means of passing water through a constricted orifice at the inlet end of the rearing pond, currents are created in the water which carry the settled waste material toward the outlet end of the rearing pond. In order that the fish are retained in the pond, suitable means are provided which allow passage of the water and settled waste material therethrough while prohibiting passage of the fish therethrough. Floating waste material is collected at the outlet end of the rearing pond on means which also permit passage of the water therethrough but retain the fish within the rearing pond. In this manner, the overflow from the pond is allowed to pass through a conduit and return to the delivery launder after the waste material has been removed therefrom.

Following the waste removal operation from the pond, selected gates and valves are opened or closed according to the desired flow path of the water and sediment through the fishery system. Means are then opened which allow the sediment and water to pass into a disposal launder and continue flowing past the isolated ponds and tanks throughout the system. In this manner, the isolated areas do not receive the waste material or contaminated water flowing from the rearing pond. When desired, the fish in any one or more of the ponds may also be removed in a like manner.

At periodic intervals of time, the fish may be discharged from any one of the various rearing ponds and passed through the delivery launder to the separating area. The fish are therein separated into various predetermined size ranges. Fish of a selected size are then delivered to one of the handling areas while other fish not falling within the selected size range are delivered to another handling area. Within the handling areas the fish are urged by mechanical means toward the discharge ends of the handling areas where they are subjected to a gravity discharge through discharge ports and corresponding conduits into a troughway wherein the fish are again conveyed by gravitational force to the end of the discharge trough. A gate means urges the fish to either one of two discharge ports and onto weighing pans for the weighing and automatic discharge of the fish into a loading chute.

The purpose of isolation of the rearing ponds as well as the other ponds and tanks in the system while one of the ponds is being discharged of water, fish, and/or waste material therefrom, is two-fold. Firstly, by means of isolating the other tanks in the system, the discharge from the rearing pond can be directed to a disposal area or when desired, the fish may be conveyed to any of the handling or separating areas. Secondly, in the case where disease has been contracted by the fish in a rearing pond, they may be disposed of without subjecting the other fish in the system to the diseased water or other diseased fish.

It is to be understood, that the above method may be carried out in any number of sequential operations by defining a desired pathway through the opening and closing of various gates and valves throughout the fishery system. In this manner, any pond or tank in the system may be emptied of its content, or if desired, merely to remove the settled waste material therefrom and convey said material to a disposal area through a preselected pathway.

It should also be understood that the above method can be carried out with a minimum number of personnel and with a large savings in cost by the fact that diseased fish are isolated from the other fish in the system or, for that matter, water which has been contaminated is emptied from the system without contacting other fish therein.

*Apparatus for carrying out method*

Apparatus for carrying out the above-described method is shown in FIGURES 1 through 8. Referring now to FIGURES 1 and 2, there is disclosed a rearing pond 1*a* at a first level of the terrain and a second rearing pond 1*b* at a level below that of the first rearing pond. A fresh water and fish delivery launder 2 is disposed parallel to the rearing ponds and connected thereto by means of connecting launders 2*a*. It is to be understood that the rearing ponds and various launders throughout the fishery can be constructed in the usual manner through the use of concrete and other construction materials or can be merely dug out of the ground where such is desirable. For the purpose of clarity and for a better understanding of the invention, only one of the rearing ponds will be referred to for purposes of description but it should be understood that all the rearing ponds in the system are constructed in the same manner.

At the inlet end of each pond, a head launder 6 is provided, and extending laterally from each head launder is a connecting launder 2*a* communicating with the delivery launder 2 and a similar connecting launder 3*a* communicating with the disposal launder 3. While the illustration in FIGURE 1 only shows these connecting launders being connected to the head launder 6 of the rearing pond 1*b*, it will be understood that they are also connected in a similar manner to the head launder of the rearing pond 1a, and of each of the other rearing ponds.

Within each of the head launders 6 a swingable gate 5 is mounted, capable of assuming either one of two positions. In the first instance, the head launder gate 5 may be swung into the full-line position shown in FIGURE 1 wherein the head launder is divided into two sections. The rearing pond 1b situated at the lower level is connected to the delivery launder 2 by means of the connecting launder 2a and the rearing pond 1a on the upper level is connected by means of a sediment removal pipe 12 through the head launder 6 and through the connecting launder 3a to the disposal launder 3. It is thus seen that fish and fresh water may be introduced into any one of the rearing ponds 1 by first moving a delivery launder gate 4 into the full-line position shown in FIGURE 1, so that the fish are directed into the head launder 6 and then into the rearing pond 1 when the head launder gate 5 is in its first-mentioned position. The delivery launder gate 4 has a vertical sliding baffle 4a which slides over a fixed screen 4b when it is desired to direct the fish and fresh water into the head launder. If it be desired to by-pass the lowermost rearing pond 1b and to deliver fish and fresh water to one of the successive lower elevated ponds, the launder gate 4 may be swung into the dotted line position whereby the connecting launder 2a would be cut off from the delivery launder 2 and the fresh water and fish would flow in the delivery launder until deflected by another launder gate into one of the head launders.

While fish are being reared in the ponds, the problem of waste removal is always present. The waste material can take the form of either (1) floating waste which remains on top of the water within the ponds, or (2) as settled waste material, such as the sediment 20 shown in the sediment removal pipe 12. At the outlet end of the rearing pond a waste removal screen 19 having three sides as seen in FIGURE 1 is supported on a concrete base structure 19a and is removable therefrom for purposes of repair or replacement. Connected by conventional brackets 18a is a screen lift 18b for lowering or raising the fish retaining screen 18 located in front of the concrete support outlet 19b. At the inlet end of the rearing pond, a conduit 7 having a constricted orifice 9 is supported at the lower portion of the pond. As explained more fully below, this constricted orifice creates a current in the water toward the outlet end of the rearing pond. By means of such current, the settled waste material 20 is urged through the fish-retaining screen 18 and into the sediment removal pipe 12. For purposes of controlling the sediment flow into the sediment removal pipe 12, a vertically adjustable gate 13 is slidably mounted on the rear wall of the rearing pond. By means of a lift 13a the gate may be raised or lowered to the desired position.

When the floating waste screen 19 has been overly cluttered with floating waste material, a brush or rake is used for removing the material from the trash screen 19. Thus, the water is filtered before flowing through the overflow pipe 14 which is connected to the delivery launder 2. A high-pressure water pipe 15 extends the full length of the fishery system and is disposed alongside the ponds therein. Connected to this high-pressure pipe 15 at each of the outlet ends of the rearing ponds is a cleaning pipe 17 and shut-off valve 16. As seen in FIGURE 2, the cleaning pipe 17 has a nozzle 17a rearwardly disposed from the fish retaining screen 18. In those instances when the retaining screen has accumulated impassable sediment, it is desirable to remove the retained sediment therefrom and such removal is carried out by a blast of water under pressure from the nozzle 17a by operation of the shut-off valve 16.

In order to collect the sediment 20 within the sediment removal pipe 12 it is necessary to close the outlet end thereof by means of a slide gate 11. A control means 11a is provided for raising and lowering the slide gate. The water in the sediment removal pipe is allowed to flow therethrough by means of a drain-off conduit 7, past the shut-off valve 8 connected in the line 7, and then through the constricted orifice 9 for creating the aforesaid current in the next successive and lower rearing pond 1b. In order that an operator may determine the volume of sediment within the removal pipe 12, an indicator pipe 10 is connected to the line 7 which allows passage of water therethrough and into the lower rearing pond 1b. In this manner the operator may see an indication of sediment in the water passing through the indicator pipe 10, and can thereby determine if removal of sediment from the removal pipe is necessary.

The flushing operation of the sediment 20 from the sediment removal pipe 12 is carried out in the following manner. The head launder gate 5 is moved to the full-line position shown in FIGURE 1 so that the sediment may not pass into the lower rearing pond 1b through the head launder but rather into the disposal launder 3 through the connecting launder 3a. In order to prevent passage of the sediment and contaminated water into the lower and successive rearing ponds in the system, the head launder gates 5 in those head launders below the rearing pond to be cleaned will be in the position shown by the dotted line construction in FIGURE 1. Likewise, it will be necessary to close the wing gates 21 and 22 shown in FIGURE 3 in connection with the separating tank 25 so that the water and sediment do not pass into the tank. In this manner, the sediment and water are carried off to a disposal area through the disposal launder 3 without any passage of the sediment into the other ponds and tanks in the fishery. During the sediment removal operation, the fish retaining screen 18 remains in the down position shown in FIGURE 2, and the slide gate 13 is partially closed to provide a forced current in the water for forcing the sediment out of the sediment removal pipe 12 and into the head launder. The slide gate 11 is opened from the normally closed position so that the sediment 20 is washed into the head launder 6 and diverted by the head launder gates 5 into the disposal launder 3 to a disposal area away from the pond. This cleansing operation should require only a short period of time and thereby eliminates the need to drain the rearing pond 1a for cleaning and also eliminating the need of removing fish from the rearing pond. Moreover, the operation only requires a small amount of water for the removal of sediment from the sediment removal pipe and to convey the same to the disposal area. Upon completion of the cleaning operation, slide gate 11 is closed by means of the operating handle 11a and slide gate 13 is fully opened by the actuator 13a to allow the water to continue flowing into the lower rearing pond 1b through the conduit 7.

In the event that the fish in any of the rearing ponds have contracted a disease or if the water therein becomes contaminated, it would be necessary to remove the fish or water or both from the rearing pond and to divert the fish and water from the other ponds and into a disposal area. In such a case, the control valve 8 in line 7 would be closed and the head launder gate 5 retained in the position shown in FIGURE 1. Slide gates 11 and 13 are opened so that the water and fish can flow through the sediment removal pipe 12. The fish retention screen 18 remains in the down position if only the contaminated water is to be disposed of during this operation. Thus, the water in the rearing pond 1a, for example, is allowed to flow from the pond into the collection pipe 12, through the head launder 6, connecting launder 3a, and out to a discharge area by means of the disposal launder 3. It should be noted that in this operation the slide gate 13 plays an important part in that the water level in the rearing pond 1a must be maintained below the level of the overflow pipe 14 in order to prevent contaminated water from being introduced into the successive lower ponds through the delivery launder 2 and head launders 6 at each of the rearing ponds.

When the fish in any of the rearing ponds have reached a desired size range or are required to be moved into the next lower pond for one of various reasons, the sediment removal pipe 12 is cleaned in the manner described above. The head launder gate 5 is then moved to the dotted line position shown in FIGURE 1 so as to close off the entrance to the connecting launder 3a and thereby open the head launder for clear passage from the sediment removal pipe 12 to the next lower rearing pond 1b. Slide gates 11 and 13 are then opened and the fish retention screen 18 is raised to the open position by means of the actuator 18b. In this manner, the water and fish within the upper rearing pond 1a are allowed to flow through by force of gravity into the next lower pond 1b through the head launder.

As explained above, the fishery system can comprise any number of rearing ponds in a longitudinally descending line. Connected to the sediment removal pipe 12 of the lower most rearing pond is a head launder 23 which empties into a size separation tank 25 shown in FIGURES 3 and 4. Assuming first, for the matter of discussion, that the fish in the rearing pond just above the separation tank have reached the required size for stocking or sale, the following procedure is used to remove these fish from such rearing pond and convey the same into the separation tank. The wing gate 21 will be retained in the full-line position shown in FIGURE 3 and the fish retaining screen 18 is moved to the raised position by the actuator 18b while the slide gates 11 and 13 are moved into the open position. In this manner, the water and fish from the rearing pond are allowed to enter the launder 23 and flow into the separation tank 25 over a separator board 24. The separator board 24, has a plurality of apertures 24a on the surface thereof which are of a size necessary to allow fish of a selected size range to pass therethrough while fish above the predetermined size range pass over the separator board and into a delivery launder 27 for passage to a handling area. The separator board is removably supported on the separation tank by the recesses 25a and 25b. As seen in FIGURE 4, the smaller fish will drop into the separation tank through the apertures in the separation board, and when the slide gate 26 is in the up position the fish will flow from the separation tank into the small delivery launder 28 and into the handling tank 30.

When it is desired to remove the fish from a rearing pond other than as just described in the preceding paragraph, the wing gate 22 is moved to the dotted position shown in FIGURE 3 so as to divert the flow from the disposal launder 3 into the size separation tank. In this instance, the head launder gate 5 remains in the position shown in FIGURE 1 and the fish retaining screen 18 is raised along with the slide gates 11 and 13 so that water and fish are allowed to flow into the connecting launder 3a and then down through the disposal launder and into the separating tank.

Inasmuch as the fish size will vary and since it is sometimes necessary to shift a predetermined size fish, it is sometimes necessary to substitute the separator board with one having different sized apertures therein. Such a change may be carried out by merely lifting the separating board off of the recesses 25a and 25b and replacing it with another separator board having different sized apertures.

Since it is desired to keep the fish separated according to size, the large delivery launder 27 empties into a handling tank 29 while the small delivery launder carries the fish having passed through the separation board to a handling tank 30 which is disposed in parallel relation to the other handling tank. For purposes of discussion therefore, reference is only made to the operation of the handling tank 30 which operation would be the same in the other handling tanks. As seen in FIGURE 5, the handling tank 30 has on the upper edges thereof a roller track 30' on each side of the tank. A track mounted crowding screen 31 is supported by the longitudinally moveable carriage 48 which rides on the rollers 31a rotatably mounted on the transverse axles 31b. By means of an electrically driven reversible motor 32 and the double drum winch 32a the carriage is moved from one end of the handling tank 30 to the other. Cables 32b are attached as shown by reference numeral 58 to the roller axles 31b on one side thereof and reeved about the pulley 32c mounted below the delivery launder 28 at the inlet end of the handling tank. As more fully seen in FIGURE 6, the crowding screen 31 extends from the top of the tank to the bottom edge thereof. The discharge pipe 34 is pivotally mounted to the outlet end of the handling tank and is raised and lowered by means of the motor 33 and winch 50 which operates the flexible cable 51 attached at 52 to the discharge pipe 34. In this manner, the discharge spout 53 can be closed merely by raising the discharge pipe 34 into a vertical position so that the water within tank 30 is prevented from flowing therefrom. During the final handling operation the discharge pipe 34 is lowered from its normal vertical position by the lowering winch 50 so that the outlet port 47 of the discharge pipe rests on the longitudinal trough 35. Merely by lowering the discharge pipe into this position, a small volume of fish will be removed. However, to insure rapid removal of the fish from the handling tanks, the track mounted crowding screen 31 is moved from the inlet end of the tank to the outlet end by means of the reversible motor 32 and double drum winch 32a so that the fish are urged toward the outlet end of the tank by means of the screen.

Figure 7:
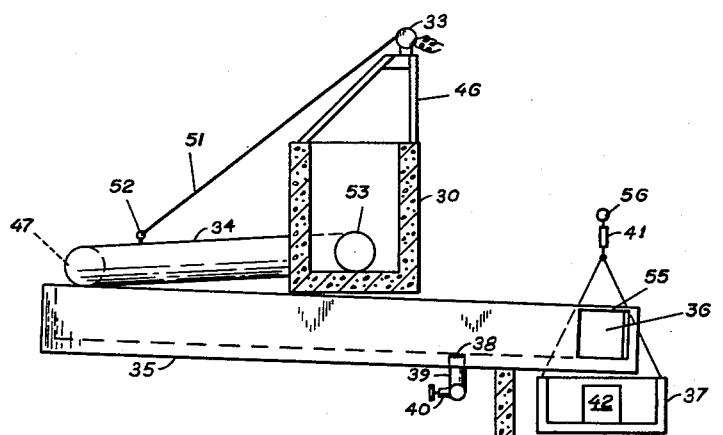
FIGURE 7 is a sectional side elevation of the discharge means, and the automatic weighing station taken along the line 7—7 of FIGURE 5.
Figure 8:
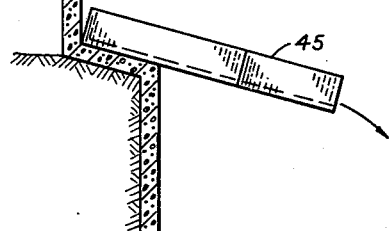
FIGURE 8 is an end elevation of the weighing station and the corresponding loading means.

With the fish in the discharge trough 35, excess water is drained off through a drain screen 38 and drain pipe 39 having a control valve 40 connected to the outlet end of the drain pipe. By means of the control valve 40 the flow of excess water is terminated when it is desired to add water to the transporting truck tank for transporting the delivered fish. A wing gate 36 is pivotally mounted to the end of the discharge trough so that the outlets 54 and 55 may be either opened or closed by the gate 36 and thereby allow selective delivery to either one of the weighing pans 37. The weighing pans as more fully seen in FIGURES 7 and 8 are disposed below and to the side of the end of the discharge trough 35 so that the fish are discharged therefrom by the force of gravity and dropped into the selected weighing pan 37. An overhead beam 56 supports the scale 41 and the weighing pans 37 through the cables 57. The weighing pans 37 are manually emptied so that the fish therein are deposited into the loading chute 45 past the flap gates 42. These flap gates 42 are connected to the weighing pans by means of the springs 44. Connecting cables 43 are anchored to the trough 35 and to the lower end of the flap gates 42 so that upon a tilting movement of the weighing pan 37, as seen in FIGURE 8, the flap gate 42 will automatically assume the open position as shown, thus allowing discharge of the fish from the weighing pan into the loading chute. The normal position of the flap gates 42 is in the closed position shown in the weighing pan 37 at the left of FIGURE 8. By means of the springs 44, the weighing pans 37 are brought back to their normal horizontal position after discharging the fish therefrom. From the loading chute, the fish pass into the transporting tank truck or other selected means for transporting the fish to the desired location.

It will thus be readily appreciated that the aforementioned method of rearing, separating and handling fish and the associated apparatus for carrying out such method is readily conducive to efficient and relatively simplified operation. All of the ponds and tanks may be constructed of concrete or other suitable construction material or the use of earth ponds may be utilized where desired. The vertical elevational drop betwen the ponds should be at least eight feet between the bottom of the upper pond and the bottom of the next successive pond. Preferably, the outlet ends of the ponds and the outlet works for supporting the screens are of concrete construction to keep maintenance at a minimum. All the launders may be formed in a relatively simple and economical manner by means of concrete or earth construction.

Having thus described the invention, what is desired to be secured by United States Letters Patent is:

1. A method of separating floating waste material and sediment from water which has traversed a fish rearing pond, said method comprising the steps of:
   (a) introducing a water stream into said pond;
   (b) permitting water to escape from said pond at a first lower level and at a second upper level therein whereby a first water current flows past a first location adjacent said upper level and a second water current flows under said first location toward a second location moving sediment toward said second location;
   (c) collecting floating waste material at said first location;
   (d) collecting sediment at said second location;
   (e) combining said first and second water currents at said second location;
   (f) passing the combined currents to a next successive rearing pond, and
   (g) sequentially repeating steps (a) through (e) with respect to said next successive rearing pond so that fresh water is passed thereto and therefrom.

2. The method defined in claim 1 and further including the step of periodically drawing the combined currents through said second location to empty collected sediment therefrom.

3. Apparatus for rearing fish wherein floating foreign matter and sediment is removed from the apparatus while water is continuously passed therethrough, comprising the combination of a plurality of successive rearing ponds having inlet and outlet ends, means for delivering water and fish to the inlet end of each of said rearing ponds, first screen means for collecting floating foreign matter thereon, second screen means vertically spaced from said first screen means and permitting passage of sediment and water therethrough while retaining the fish in said rearing ponds, means at the inlet end of each of said rearing ponds creating a current therein for moving said sediment toward said outlet end of each of said ponds and through said second screen means, means for delivering water under pressure to each of said ponds for removing sediment retained on said second screen means, a sediment removal conduit connected to each outlet end of said ponds, gate means for controlling the flow of water and sediment into and out of said sediment removal conduits, and means for passing water in each of said sediment removal conduits to the next successive rearing pond for creating a current therein so as to move the sediment in said successive rearing pond toward the outlet end thereof.

4. The combination defined in claim 3 further including means for discharging the sediment from said sediment removal conduit to a disposal area.

5. The combination defined in claim 4 further including a head launder disposed at the inlet end of each of said rearing ponds, and said sediment removal conduit having one end thereof connected to the head launder of the next successive rearing pond, swingable gate means in said head launders for alternatively directing fluid flow from said delivery means to said next successive rearing pond or from said sediment removal conduit to said discharging means.

6. Apparatus for rearing, separating, handling and weighing fish comprising, in combination, a plurality of rearing ponds stepped successively downward from an uppermost pond to a lowermost one, each of said ponds having an inlet end and an outlet end, means interconnecting the outlet end of one pond with the inlet end of the next adjacent pond, a fresh water and fish delivery conduit communicating with the inlet end of each of said ponds to permit fresh water and fish to be supplied thereto, valve means between said delivery conduit and each inlet with said valve means being selectively operable to control flow from said delivery conduit, a waste filtering means disposed adjacent the outlet end of each of said ponds, a disposal conduit selectively connectable with each of said outlet ends to receive waste from said filtering means, said lowermost pond outlet end communicating with a separation pond, said delivery conduit terminating at said separation pond, said separation pond having at least two superposed levels with an apertured member between such levels, said apertured member permitting fish of less than a given size to drop therethrough into a next lower level, each of said separation pond levels having an outlet channel for conveying fish from that level, each of said outlet channels being respectively connected with a separate handling tank, each of said handling tanks being selectively connectable with a common discharge trough, and fish weighing means disposed adjacent the outlet of said trough whereby fish coming from said trough may be weighed.

7. Apparatus as defined in claim 6, wherein a pair of guide rails are disposed in parallel relation to each other on each side of each handling tank, a movable screen carriage means mounted on each handling tank, wheel means journaled on said screen carriage means supporting said carriage means and mounted on said guide rails, and means for powering said carriage along said rails.

8. The combination of claim 7 wherein said screen carriage means comprises a vertically depending screen extending into said handling tank whereby said fish are urged in one direction for discharge from said handling tank, and said means for powering said carriage comprises a powered winch having a flexible cable reeved thereon and attached to said screen carriage.

9. Apparatus as defined in claim 6 wherein said weighing means includes a plurality of scales and weighing pans, and connecting means between said discharge trough and said weighing pans whereby a predetermined weight of fish will automatically discharge to said weighing pans.

References Cited by the Examiner
UNITED STATES PATENTS

| | | | |
|---|---|---|---|
| 148,035 | 3/74 | Clark | 119—3 |
| 518,319 | 4/94 | Hoxsie | 119—3 |
| 1,252,500 | 1/18 | Schnoor | 119—5 |
| 1,528,179 | 3/25 | Baldridge | 119—3 |
| 2,944,513 | 7/60 | Keely | 119—3 |
| 3,096,600 | 7/63 | Gwyther | 119—3 X |

SAMUEL KOREN, *Primary Examiner.*

HUGH R. CHAMBLEE, *Examiner.*